Patented Oct. 2, 1923.

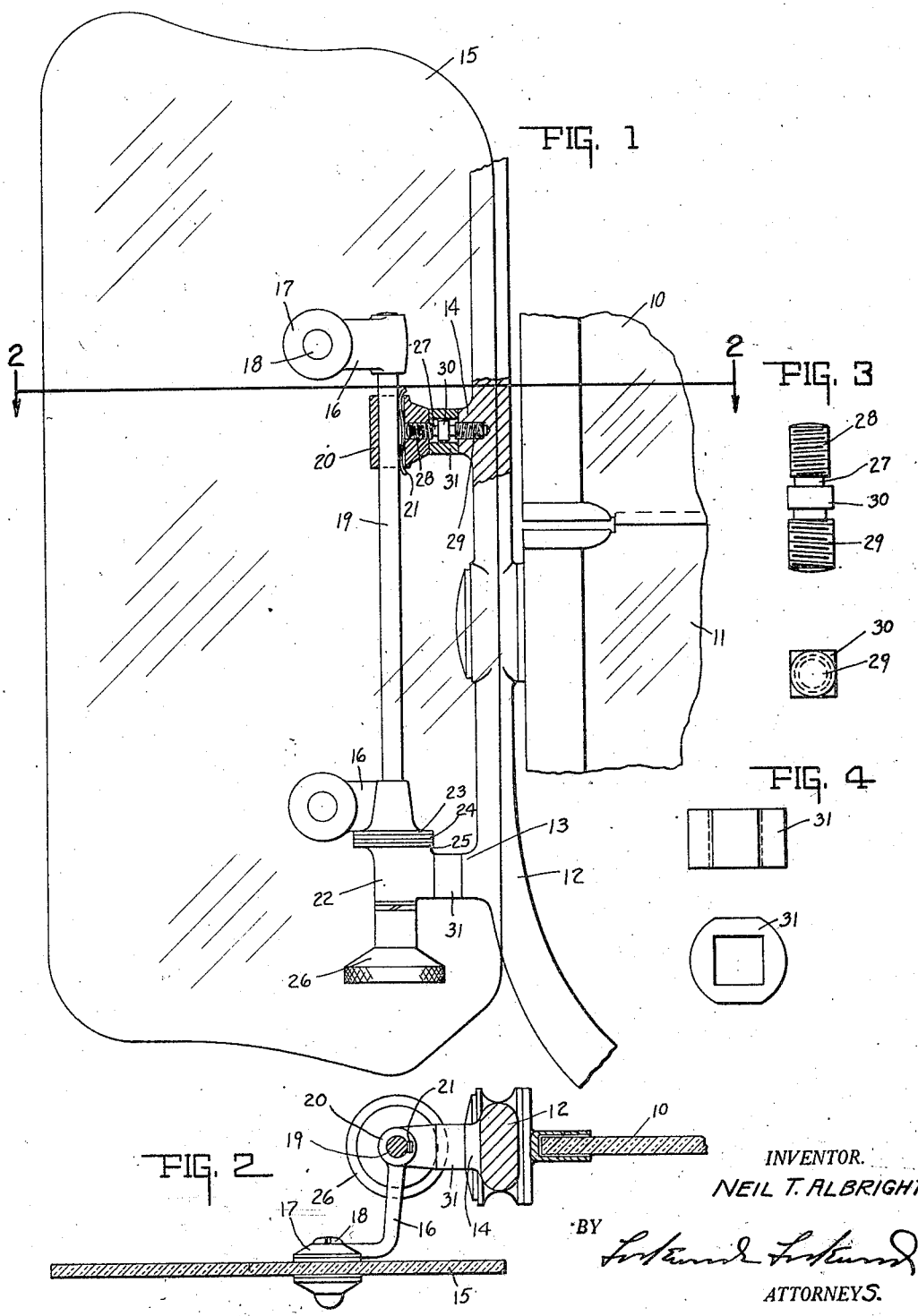

1,469,372

UNITED STATES PATENT OFFICE.

NEIL T. ALBRIGHT, OF KOKOMO, INDIANA, ASSIGNOR TO KOKOMO AUTOMOTIVE MFG. CO., OF KOKOMO, INDIANA, A CORPORATION.

WINDSHIELD WING.

Application filed November 15, 1922. Serial No. 601,119.

*To all whom it may concern:*

Be it known that I, NEIL T. ALBRIGHT, a citizen of the United States, and a resident of Kokomo, county of Howard, and State of Indiana, have invented a certain new and useful Windshield Wing; and I do hereby declare that the following is a full, clear, and exact description thereof, reference being had to the accompanying drawings, in which like numerals refer to like parts.

This invention relates to a wind shield wing or deflector adapted to be adjustably secured upon the sides of the wind shield.

The object of this invention is to improve the means for rigidly securing the supporting elements of the wing directly to the upright frame portion of the wind shield. This is accomplished by providing a double ended oppositely threaded bolt having a head positioned intermediate the threaded ends thereof, whereby said bolt may be simultaneously screwed in the wing supporting member and the frame, so as to draw them securely together. To compensate for variations in the pitch of the thread, length of bolt or the like, a gripping nut is non-rotatably, but slidably positioned about the head for permitting the head to be turned, said nut taking a position wherein it will be rigidly wedged between the parts, and enclose the bolt.

The full nature of the invention will be understood from the accompanying drawings and the following description and claims.

In the drawings Fig. 1 is an elevation showing the wing attached to the upright supporting frame member of the wind shield. Fig. 2 is a section taken on the line 2—2 of Fig. 1. Fig. 3 is a side elevation and end view of the securing bolt. Fig. 4 is a plan view and side elevation of the actuating nut.

In the drawings there is shown a portion of a wind shield comprising an upper shield member 10 and lower shield member 11, the lower shield member being pivotally mounted on the supporting frame member 12. The member 12 is provided with the laterally extending bosses 13 and 14 which are provided with internal screw threads.

The wing is comprised of the shield 15 made of glass and mounted on the laterally extending bracket arms 16. The manner of mounting consists in clamping the glass between two clamping disks 17 at spaced points thereon, and securing the clamping disks in position by the bolt or screw 18 extending through suitable holes in the glass shield. The bracket arms 16 are secured upon the vertical rod 19.

Positioned on the rod 19 near the upper bracket 16, there is a supporting sleeve member 20 in which said rod is adapted to turn against the friction caused by the yielding spring 21 inserted in a suitable slot in said member and frictionally bearing against the surface of the rod. The supporting sleeve member 22 is similarly positioned on said rod near the lower end thereof adjacent the bracket arm 16. It is provided with a friction spring similar to that one shown in respect to the member 20. This permits the shield, bracket arm 16 and rod 19 to move about said rod as an axis within the members 20 and 22, which are fixedly mounted upon the supporting frame 12.

The lower end of the bracket arm 16 is provided with a friction face 23 which frictionally engages the friction washers 24, which in turn frictionally engage the friction face 25 of the member 22. The clamping nut 26 is adapted to screw on the lower end of the rod 19 so that its end frictionally bears against the lower face of the member 22, whereby said member may be frictionally clamped between the nut 26 and the member 16 for holding the rod in the adjusted position with respect thereto.

The members 20 and 22 are in turn rigidly secured to the supporting frame 12 by the bolt 27, said bolt having oppositely extending threaded ends 28 and 29, the threads of which are oppositely wound. Intermediate the threaded ends thereof, there is a rectangular head 30 upon which the sleeve nut 31 is adapted to loosely fit, the central opening through said nut being rectangular and corresponding to the head 30, as shown in Fig. 1. By means of this arrangement, when it is desired to secure the wing upon the wind shield, the nut 31 is placed over the head 30, the wing placed in position, and the screw ends of the bolt screwed into the respective threaded openings in the members 21 and 14, and 22 and 13. The nut 31 is then turned with a wrench so as to cause the bolt to simultaneously screw in both sets of members and draw them together. By reason of the fact that the bolt 31 is loosely mounted upon the head 30, it is immaterial that the screw threads be exactly identical in pitch, or that they be started simultaneously in engagement with the receiving threads. This is because of the fact that the head 30 may finally take the position adjacent the members 20 and 22, or the bosses 13 and 14; while the nut 31 is substantially wider and will be engaged and clamped therebetween to make a tight and perfect fit. In this connection, it will be obvious that without the use of the sliding nut 31, if one end of the bolt engages the receiving threads and screws therein before the other end starts in its side, or if the threads are of slightly different pitch, the head 30 will take the position near one side and be placed from the other side while the nut 31 will slide thereon to proper position between the members making a tight and solid connection.

The invention claimed is:

1. In a wind shield wing, the combination of a wind shield having a post member, an internal screw threaded receiving socket in said member, a supporting member for said wing provided with an internally threaded receiving socket, a screw threaded bolt adapted to screw into said members for drawing said members together, and means non-rotatably and slidably mounted on said bolt for permitting the turning thereof adapted to be so positioned as to be rigidly engaged between said members, whereby said bolt will be concealed.

2. In a wind shield wing, the combination of a wind shield having a supporting post, an internally screw threaded receiving socket in said post member, a supporting member for said wing provided with an internally threaded receiving socket, a double ended bolt having oppositely directed screw threads on the ends thereof adapted to simultaneously screw into said receiving sockets for drawing said members towards said support and clamping them rigidly thereon, and means non-rotatably and slidably mounted on said bolt for permitting the turning thereof adapted to be so positioned as to be rigidly engaged between said members, whereby said bolt will be concealed.

3. In a wind shield wing, the combination of a wind shield having a supporting post, an internal screw threaded receiving socket on said post, a supporting member for said wing provided with an internally threaded receiving socket, a double ended bolt having oppositely directed screw threads on the ends thereof adapted to simultaneously screw into said receiving sockets for drawing said member towards said post and clamping it rigidly thereon, and a nut for turning said securing bolt positioned so as to be rigidly clamped between the socket and supporting member when turned to tightened position.

4. In a wind shield wing, the combination of a wind shield having a supporting post, an internal screw threaded receiving socket on said post, a supporting member for said wing provided with an internally threaded receiving socket, a double ended bolt having oppositely directed screw threads on the ends thereof adapted to simultaneously screw into said receiving sockets for drawing said member towards said post and clamping it rigidly thereon, a head on said securing bolt positioned intermediate of said screw threaded ends for enabling the bolt to be gripped and turned into locking position, and a loose nut slidably and non-rotatably mounted on said head in position to permit the same to be turned and be rigidly clamped between said member and post.

5. In a wind shield wing, the combination of a wind shield having a supporting post, internally screw threaded receiving sockets on said post, a wing shield, bracket arms rigidly secured to said wing shield, an intermediate rod connecting said bracket arms, supporting members frictionally and rotatably mounted on said rod, whereby said rod may be rotatable therein, means for clamping said rod and shield in adjusted position with respect to said supporting members, and a double ended bolt having oppositely directed screw threads on the ends thereof adapted to simultaneously screw into said receiving sockets for drawing said members towards said post and clamping them rigidly thereon, a head on said securing bolt positioned intermediate of said screw threaded ends for enabling the bolt to be gripped and turned into locking position, and a loose nut slidably and non-rotatably mounted on said head in position to permit the same to be turned and be rigidly clamped between said member and post.

In witness whereof, I have hereunto affixed my signature.

NEIL T. ALBRIGHT.